United States Patent [19]

Gallo et al.

[11] Patent Number: 4,699,591
[45] Date of Patent: Oct. 13, 1987

[54] ROTATABLE CONNECTOR

[75] Inventors: Bruce M. Gallo, Chester; Charles Hannon, Clinton; Kurt Augustin, Mendham, all of N.J.

[73] Assignee: Telcor Inc, Chester, N.J.

[21] Appl. No.: 740,970

[22] Filed: Jun. 4, 1985

[51] Int. Cl.$^4$ ............................................. H01R 39/02
[52] U.S. Cl. ......................................................... 439/21
[58] Field of Search ............ 339/6 R, 8 R, 8 P, 8 PB, 339/182, 183; 179/186

[56] References Cited

U.S. PATENT DOCUMENTS 4,533,796  8/1985  Engelmore ..................... 339/8 R X Primary Examiner—Eugene F. Desmond
Attorney, Agent, or Firm—Darby & Darby

[57] ABSTRACT

A connector for a modular telephone handset having a first part with modular terminal means thereon for connection to the modular terminal means of the handset and a second part coupled to the first part for rotation relative thereto. The second part has a modular receptacle terminal located at a fixed angle which is displaced from the common axis of the connector, said angle being greater than 0° and less than 180°, and preferably about 90°, to accept an external modular terminal on an attached cord which can be twisted. The movement of the cord relative to the connector first part, by movement of either the cord or the handset, providing a torque force to the second part at said angle so that the second part rotates relative to the first part to prevent twisting of the cord. An electrical connection is provided between the terminals of the first and second parts by a member having a plurality of conductive tracks thereon in one part and contact means which ride on said tracks in the other part.

16 Claims, 3 Drawing Figures

U.S. Patent  Oct. 13, 1987  4,699,591
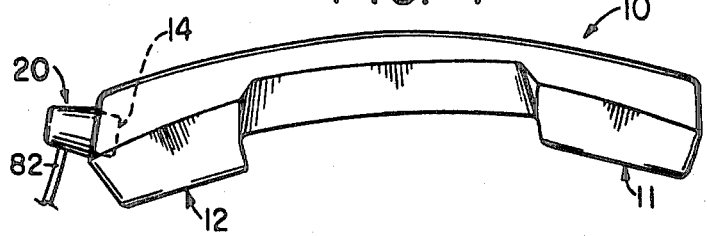
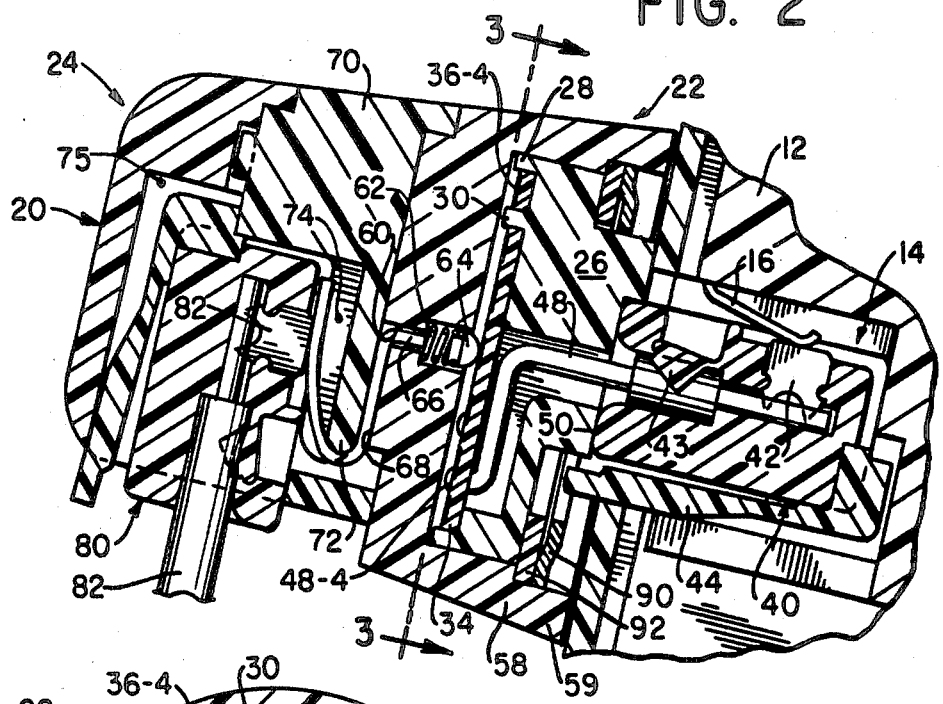
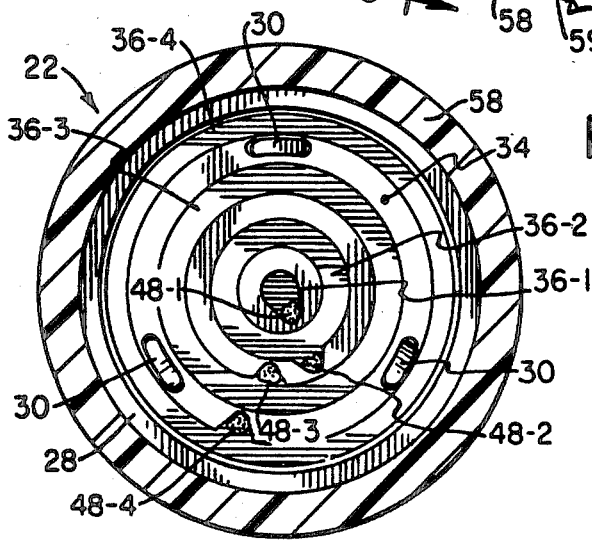

ROTATABLE CONNECTOR

The present invention relates to a connector which is capable of rotary movement and particularly one which is useful for telephone handsets and other similar devices.

In the present state of the art, various types of connectors exist for imparting rotating movement between two parts having an electrical terminal on each part. The present invention relates to an improved device of this type and, more specifically, one in which one of the connector parts has a receptacle into which the electrical contacts of a modular plug are to be inserted which is at right angles to the major longitudinal axis of the entire connector. Due to the construction of the connector, upon any force being applied to this connector part in a direction substantially normal to the connector's longitudinal axis, the first part is caused to rotate relative to the second part. The improved connector of the present invention is particularly useful where the modular plug which is to be inserted into the first part is at the end of a cord, or wire, so that as the cord is moved, the first part of the connector is caused to rotate and the cord will not coil.

It is therefore an object of the present invention to provide a rotatable connector.

Another object is to provide a rotatable connector having two parts which are rotatable with respect to each other, one of the parts having an entry portion for a modular plug to which a wire is attached which is at a right angle to the exit portion of the other part which has a modular plug for insertion into another modular receptacle.

A further object is to provide a rotatable connector having two parts in which the rotational electrical connection is provided by each of a plurality of contacts riding on a respective conductive track of a printed circuit board.

Other objects and advantages of the present invention will become more apparent upon reference to the following specification and annexed drawings in which:

FIG. 1 is a perspective view of a telephone handset with which the rotary connector of the subject invention may be used;

FIG. 2 is a view in cross-section of the connector; and

FIG. 3 is a cross-sectional view taken along lines 3—3 of FIG. 2.

FIG. 1 shows a typical telephone handset 10 with which the rotatable connector of the present invention may be utilized. Of course, the connector may be used in any suitable application requiring the connection of two relatively rotatable sets of electrical contacts. The handset has a receiver end 11 and a transmitter end 12 with a conventional modular type socket or receptacle 14 at the transmitter end. The modular receptacle 14 has the usual spring loaded contacts 16 (one of which is shown in FIG. 2) into which a modular plug is to be inserted. Typically, a modular plug-receptacle arrangement uses for in-line contacts, although more or less can be used.

The rotatable connector 20 of the present invention is to be inserted into the modular receptacle 14 of the transmitter end 12 of handset 10. It is intended to provide electrical connection between the individual wires of a cord 82 and the handset contacts 16 in receptacle 14 while permitting the cord 82 to move relative to the handset without undesirably coiling or winding up.

The connector 20 includes respective male and female parts 22 and 24 which can rotate relative to each other. The male part 22 includes a mounting base 26 having a raised peripheral lip 28 and a plurality of raised mounting tabs 30 extending from its front face, three of which are illustratively shown, although more or less can be used. A circular printed circuit board 34, or flexible web, with suitable circuit conductors 36 laid thereon is mounted on the base 26. The board 34 has a circular central conductive pad area 36-1 and three concentric surrounding circular tracks 36-2, 36-3 and 36-4 of progressively increasing diameter. There is a space between each of the tracks 36 and the tabs 30 of the mounting base 26 protrude through the space between the tracks 36-3 and 36-4 so that the circuit board can be mounted on base 26. This can be done either by an adhesive or by ultrasonically welding the tabs 30 to or deforming the top parts thereof over the printed circuit board.

A conventional modular plug 40 having the usual lever latch 44 thereon is mounted to the bottom end of the mounting block 26. The plug 40 has the usual set of protruding contacts 42 which are in contact with the corresponding spring type contacts 16 in the modular receptacle 14 of the handset. A respective wire 48 protrudes through the circuit board 34 and is soldered to a respective track 36 thereon so that there is an individual contact with each of the tracks 36. This can be done by making a hole to each conductive area 36, through plating the hole, and making the solder contact in the hole. Thus, the front face of the board 34 will have no protrusion. The head end of each wire 48 is shown in FIG. 3.

Each of the wires 48 as it exits from the rear face of the printed circuit board 34 is bent by 90° to lie generally parallel to the rear face of the circuit board and thereafter bent another 90° to enter into the body of the modular plug 40 where they are held by the usual crimping arrangement 43. The modular plug 40 is secured by an adhesive or ultrasonically welded to the lower end of the mounting base 26 at the area 50 where the two mate.

The female part 24 of the connector includes a shell 58 having a series of four holes therein in line with the four tracks 36 on the upper face of the printed circuit board 34. A spring loaded contact assembly 62 which is formed by a laser welded coil spring, for example of beryllium copper, with a contact tip 64 welded to one end and a bare wire 66 to the other end. Each of the contact assemblies is first inserted through a respective hole 60 in the base of the shell, bare wire lead 66 first, until the spring assembly 62 is seated within the respective hole 60. The respective leads 66 are then bent over into a respective channel 68 formed on the bottom of the shell 58.

A cap 70 is then pressed onto the top portion of the shell 58 to overlie the channel 68. The cap 70 has a receptacle 75 for accepting a modular type plug 80 which is separate from the connector. The cap 70 is formed with a shelf 72 which, when the cap is assembled to the shell, extends over the ends of shell channels 68 and forms a part of the receptacle for external jack 80. The shelf 72 has a plurality of channels 74 thereon corresponding to the number of contact assemblies and the channels 68 of the shell. The free ends of the wires 66 are respectively bent into the chanels 68 to serve as the spring contacts for the external modular plug 80 having the usual conductors 82 therein with leads which have the respective contacts 86.

As seen in FIG. 2, the shell 58 of the female part 24 has a stepped lower end 59 and is held to the lower surface of the mounting base 26 of the male part 22 by a spring loaded retaining clip 90 with an intermediate bearing washer 92 which can be of plastic, fiber or any other suitable material.

As seen from FIG. 2, the jack 40 on male part 22 of the rotary connector plugs into the receptacle 14 of the handset 10 and the female part 24 provides receptacle 75 for the modular plug 80 to which the telephone cord 82 is connected. The receptacle 75 is at a right angle to jack 40. The two parts 22; 24 are held together by the retaining clip 90 which prevents them from separating. However, the female part can be rotated freely about the male half, i.e., the shell 58 has a rotating clearance relative to the base 26 of the male part 22.

Unlike similar designs where a cord enters the connector axially, i.e. the two parts of the connector would make an in-line, or axial, connection and the input and output ends are in-line, in the present invention, the cord 82 enters at 90° relative to the connector's longitudinal axis. Thus, as someone moves the handset 10 or the cord 82, instead of the cord 82 coiling or "winding up", turning force is provided for the connector female part 24 to overcome any friction between the male and female parts and causing the female part 24 to rotate relative to the male part 22. That is, the connector uses the leverage from the cord or the handset which are at right angles to each other to cause relative rotation of the two connector parts.

As should be apparent, electrical contact is provided between each of the wires of the cord 82 through a respective contact 86 of the modular plug 80 and the wire end 68 and the tip of a contact assembly 62. The rotatable contact is maintained between the two connector parts by the tips 64 of the contact assemblies 62 riding on the conductive tracks 36 of the printed circuit board. Thereafter the wires 48 connected to the tracks 36 enter the male modular plug 40 and the end of each wire is provided with an electrical terminal 42 which makes contact with spring type terminal 16 of the modular receptacle of the handpiece.

In the construction of the connector, all of the other parts are of any suitable insulating material and are preferably molded of a plastic material.

What is claimed is:

1. A rotatable connector comprising a first part having terminal means thereon,
   a second part attached to said first part for rotation relative to said first part, said second part having modular terminal means thereon which are located on said part at an angle greater than 0° and less than 180° optimally substantially a right angle, to the terminal means of said first part, the modular terminal means of said second part being adapted to accept an externally connected modular terminal means for providing a torque force so that one part can be rotated relative to the other part, and
   means for providing electrical connection between the terminal means of said first and second parts as one part of the connector rotates relative to the other comprising circuit means in one of said connector parts having at least one electrically conductive track and means connecting each of said electrically conductive tracks to a respective terminal of said terminal means of said one connector part, at least one spring biased contact means in said other part for contacting a respective electrically conductive track as the connector parts are rotated, and means connecting each of said contact means to a respective terminal of the terminal means of said other part.

2. A rotatable connector as in claim 1 wherein the terminal means of one part is a modular plug and the terminal means of the other part is a modular receptacle.

3. A rotatable connector as in claim 2 wherein the modular terminal means of said first part is a plug and the modular terminal means of said second part is a receptacle.

4. A rotatable connector as in claim 1 wherein said circuit means of said one part comprises a printed circuit.

5. A rotatable connector as in claim 1 wherein said one connector part comprises a base having an upper surface on which said circuit means is mounted, said base having a passage through which a wire connected between a respective terminal of the terminal means of said one part and a respectively electrically conductive track passes, the terminal means of said one connector part attached to said base.

6. A rotatable connector as in claim 5 wherein the axis of the terminal means of said one part is generally transverse to the plane of the circuit means, each said wire being bent by substantially 90° to enter said terminal means, and means on the base for supporting the wire.

7. A rotatable connector as in claim 6 wherein the other connector part is formed with a shelf which lies generally parallel to the plane of the circuit means, each said contact means of said other part comprising a wire which is bent around said shelf and a contact tip at one end thereof for engaging a respective electrically conductive track of said circuit means.

8. A rotatable connector comprising
   a first part having terminal means thereon,
   a second part attached to said first part for rotation relative to said first part, said second part having modular terminal means thereon which are located on said second part at some angle greater than 0° and less than 180°, optimally a right angle, to the terminal means of said first part for accepting an external means for providing a torque force so that said two parts rotate relative to one another upon occurrence of the torque force, and
   means for providing electrical connection between the terminal means of said first and second part as one part of the connector rotates relative to the other comprising circuit means with at least one electrically conductive track thereon mounted in one of said connector parts and means electrically connecting each of said electrically conductive tracks to a respective terminal of said terminal means of said one connector part, and at least one contact means in said other part for contacting a respective electrically conductive track as the connector parts are rotated, and means electrically connecting each of said contact means to a respective terminal of the terminal means of said other part.

9. A rotatable connector as in claim 8 wherein said terminal means of said second part is a modular type terminal.

10. A rotatable connector as in claim 9 wherein the terminal means of said first part is also a modular type terminal.

11. A rotatable connector as in claim 10 wherein the modular terminal means of one part is a plug and the modular terminal means of the other part is a receptacle.

12. A rotatable connector as in claim 8 wherein said electric circuit means comprises a board having a printed circuit thereon of a plurality of said electrically conductive tracks.

13. A rotatable connector as in claim 8 wherein said means for electrically connecting each said electrically conductive track to a respective terminal of said terminal means of said one connector part comprises a wire.

14. A rotatable connector as in claim 13 wherein said one connector part comprises a base having an upper surface on which said circuit means is mounted, said base having a passage through which each wire connected to an electrically conductive track passes, the terminal means of said one connector part attached to said base.

15. A rotatable connector as in claim 14 wherein the terminal means of said first part is of the modular type and lies generally transverse to the plane of the circuit means, each said wire being bent by substantially 90° to enter said modular terminal means, and means on the base for supporting the wire.

16. A rotatable connector as in claim 15 wherein the other connector part is formed with a shelf which lies generally parallel to the plane of the circuit means, each said contact means of said other half comprising a wire which is bent around said shelf and a contact tip connected to one end thereof for engaging a respective track of the circuit means.

* * * * *